United States Patent [19]
Gochman et al.

[11] Patent Number: 5,964,868
[45] Date of Patent: *Oct. 12, 1999

[54] METHOD AND APPARATUS FOR IMPLEMENTING A SPECULATIVE RETURN STACK BUFFER

[75] Inventors: Simcha Gochman, Timrot; Nicolas Kacevas, Haifa, both of Israel; Farah Jubran, Sunnyvale, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,752

[22] Filed: May 15, 1996

[51] Int. Cl.⁶ ........................................ G06F 9/42
[52] U.S. Cl. ................ 712/234; 712/237; 712/239; 712/230; 712/243
[58] Field of Search ................... 395/581, 584, 395/586, 571, 590; 712/234, 237, 239, 230, 243

[56] References Cited

U.S. PATENT DOCUMENTS

| | | | |
|---|---|---|---|
| 5,313,634 | 5/1994 | Eickemeyer | 395/700 |
| 5,511,172 | 4/1996 | Kimura et al. | 395/376 |
| 5,604,877 | 2/1997 | Hoyt et al. | 395/590 |
| 5,623,614 | 4/1997 | Van Dyke et al. | 395/587 |

*Primary Examiner*—Zarni Maung
*Assistant Examiner*—Saleh Najjar
*Attorney, Agent, or Firm*—Blakely, Sokoloff, Taylor & Zafman LLP

[57] ABSTRACT

A return stack buffer mechanism that uses two separate return stack buffers is disclosed. The first return stack buffer is the Speculative Return Stack Buffer. The Speculative Return Stack Buffer is updated using speculatively fetched instructions. Thus, the Speculative Return Stack Buffer may become corrupted when incorrect instructions are fetched. The second return stack buffer is the Actual Return Stack Buffer. The Actual Return Stack Buffer is updated using information from fully executed branch instructions. When a branch misprediction causes a pipeline flush, the contents of the Actual Return Stack Buffer is copied into the Speculative Return Stack Buffer to correct any corrupted information.

17 Claims, 4 Drawing Sheets

METHOD AND APPARATUS FOR IMPLEMENTING A SPECULATIVE RETURN STACK BUFFER

FIELD OF THE INVENTION

This invention relates to the field of microprocessor architecture. Specifically, the invention relates to a mechanism that efficiently predicts the return address for "Return From Subroutine" instructions.

ART BACKGROUND

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback logic stages such that the microprocessor operated on several instructions simultaneously. In operation, the fetch, decode, execute, and writeback logic stages concurrently process different instructions. At each clock tick the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the pipeline must continually provide the pipeline with a stream of microprocessor instructions. However, conditional branch instructions within an instruction stream prevent the instruction fetch unit from fetching subsequent instructions until the branch condition is fully resolved. In a pipelined microprocessor, the branch condition will not be fully resolved until the branch instruction reaches an instruction execution stage near the end of the microprocessor pipeline. Accordingly, the instruction fetch unit will stall because the unresolved branch condition prevents the instruction fetch unit from knowing which instructions to fetch next.

To alleviate this problem, many pipelined microprocessors use branch prediction mechanisms that predict the existence and the outcome of branch instructions within an instruction stream. The instruction fetch unit uses the branch predictions to fetch subsequent instructions. For example, Yeh & Patt introduced a highly accurate two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61) The Yeh & Patt branch prediction mechanism makes branch predictions based upon two levels of collected branch history.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing only if the branch instruction was predicted correctly.

However, if the branch prediction mechanism mispredicted the branch instruction, the microprocessor is executing instructions down the wrong path and therefore accomplishes nothing. When the microprocessor eventually detects the mispredicted branch, the microprocessor must flush the instructions that were speculatively fetched from the instruction pipeline and restart execution at the correct address.

Two types of branch instructions that are common to most computer processors are "Call Subroutine" and "Return From Subroutine" branch instructions. A Call Subroutine instruction directs the microprocessor to push a return address onto the top of a Last-In-First-Out (LIFO) stack and then proceeds with execution at a designated subroutine target address. The complimentary Return From Subroutine instruction instructs the microprocessor to pop a return address off of the LIFO stack and begin executing instructions at that address.

In most microprocessors, the LIFO stack is stored in a main memory coupled to the microprocessor. The LIFO stack is often maintained using a microprocessor register as a stack pointer. Thus, the Return From Subroutine instruction is an unconditional branch instruction that requires an access to main memory to execute. In the current generation of high-speed microprocessors, instructions that access main memory are slow relative to other instructions. It is therefore desirable to be able to predict the return address of Return From Subroutine branch instructions such that the processor does not need to stall while the main memory access occurs. This is usually accomplished using a return stack buffer.

A return stack buffer is a small buffer implemented within a microprocessor core that contains a LIFO stack of return addresses. Each time a Call Subroutine instruction is encountered, a return address is "pushed" onto the return stack buffer. When a later return from subroutine instruction is encountered, the return address on the top of the return stack buffer is "popped" off and given to the instruction fetch unit. This technique can very accurately predict the behavior of Call Subroutine and Return From Subroutine instructions.

However, when branch mispredictions occur, the information in a return stack buffer may be damaged. This will then cause another branch prediction when the damaged information is used to make a branch prediction. For example, when a Return From Subroutine instruction is speculatively fetched when it should not have been fetched and then a Call Subroutine instruction speculatively fetched, the Call Subroutine will destroy information in the return stack buffer. First, the speculatively fetched Return From Subroutine instruction will decrease the top of stack pointer into the return stack buffer. Then, the speculatively fetched Call Subroutine instruction pushes another return address on the return stack buffer that will overwrite the original (correct) return address on the return stack buffer. When the next Return From Subroutine instruction is encountered, the incorrect return address will be used thus causing another branch misprediction. It would thus be desirable to have an improved method of implementing return stack buffers in computer processors.

SUMMARY OF THE INVENTION

A return stack buffer mechanism that uses two separate return stack buffers is disclosed. The first return stack buffer is the Speculative Return Stack Buffer. The Speculative Return Stack Buffer is updated using speculatively fetched instructions. Thus, the Speculative Return Stack Buffer may become corrupted when incorrect instructions are fetched. The second return stack buffer is the Actual Return Stack Buffer. The Actual Return Stack Buffer is updated using information from fully executed branch instructions. When a branch misprediction occurs, the contents of the Actual Return Stack Buffer is copied into the Speculative Return Stack Buffer to correct any corrupted information.

BRIEF DESCRIPTION OF THE DRAWINGS

The features and advantages of the present invention will be apparent to one skilled in the art, in view of the following detailed description and drawings in which.

DETAILED DESCRIPTION OF THE INVENTION

Methods and apparatus for implementing a Speculative Return Stack Buffer in a computer processor are disclosed. In the following description, for purposes of explanation, specific nomenclature is set forth to provide a thorough understanding of the present invention. However, it will be apparent to one skilled in the art that these specific details are not required in order to practice the present invention. Well known circuits and devices are shown in block diagram form.

Figure 1:
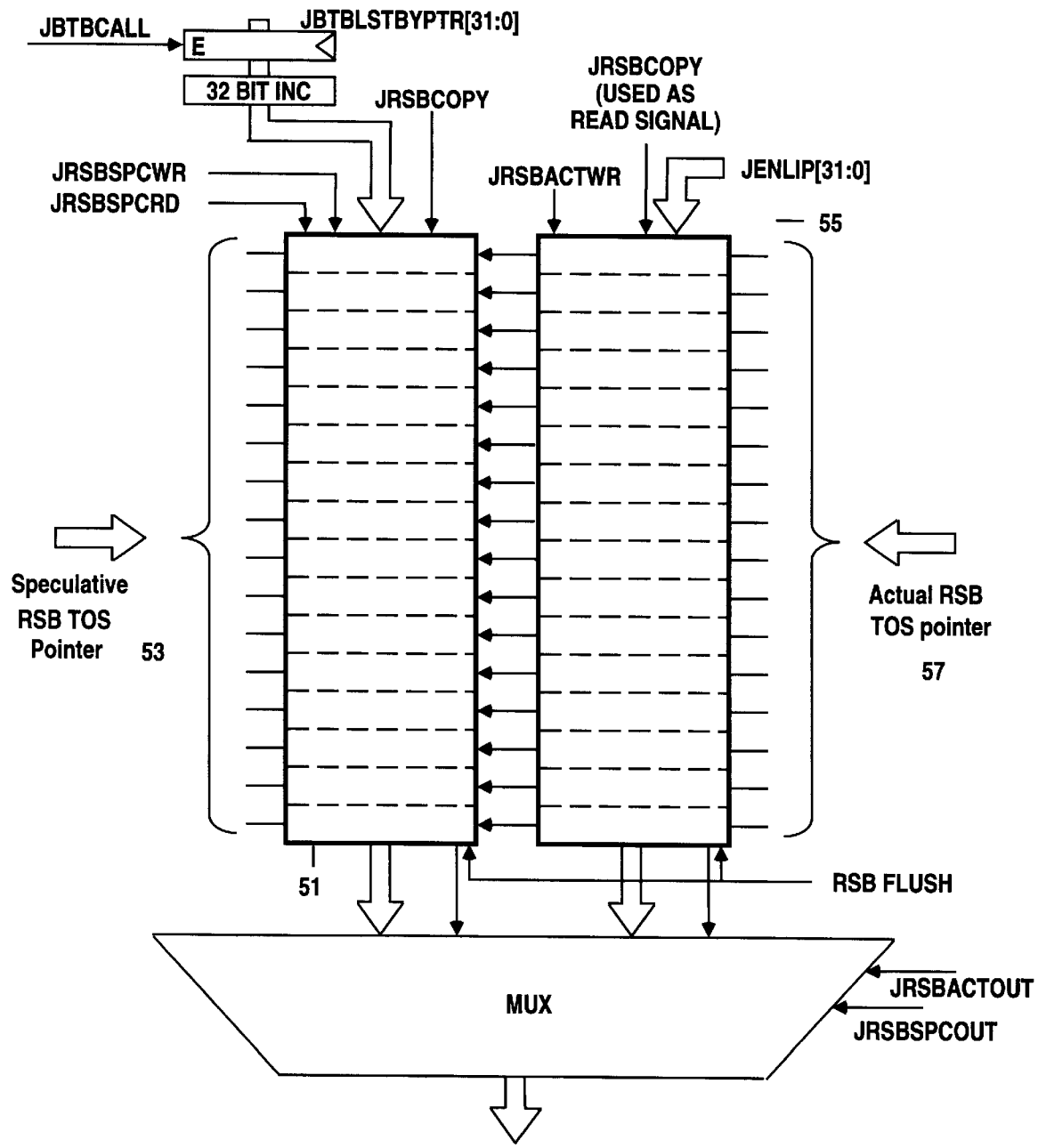
FIG. 1 is a block diagram of a dual return stack buffer mechanism that maintains a speculative return stack buffer and an actual return stack buffer.

To efficiently resolve Return From Subroutine instructions in a processor that speculatively executes instructions, the present invention uses a pair of independent return stack buffers: a Speculative Return Stack Buffer and an Actual Return Stack Buffer. FIG. 1 illustrates a diagram of a return stack buffer mechanism with the two return stack buffers.

The first return stack buffer is the Speculative Return Stack Buffer 51. The top of the Speculative Return Stack Buffer 51 is indicated using a Speculative Return Stack Buffer (RSB) Top-Of-Stack (TOS) pointer 53. The Speculative Return Stack Buffer 51 is updated with instructions that may have been speculatively fetched and thus may contain incorrect information.

The second return stack buffer is the Actual Return Stack Buffer 55. The top of the Actual Return Stack Buffer 55 is indicated using a Actual Return Stack Buffer (RSB) Top-Of-Stack (TOS) pointer 57. The Actual Return Stack Buffer 55 is updated with information from fully executed instructions and thus always contains architecturally correct information.

The two return stack buffers (51 and 55) are constructed in an bit interleaved manner such that information may be quickly copied between them.

The dual return stack buffer mechanism of the present invention has been implemented within a deeply pipelined superscalar microprocessor. Thus, this disclosure explains the dual return stack buffer mechanism within the context of a deeply pipelined superscalar microprocessor. However, it will be apparent to those skilled in the art that individual features of the dual return stack buffer mechanism can be implemented within any processor architecture that speculatively executes instructions.

Figure 2:
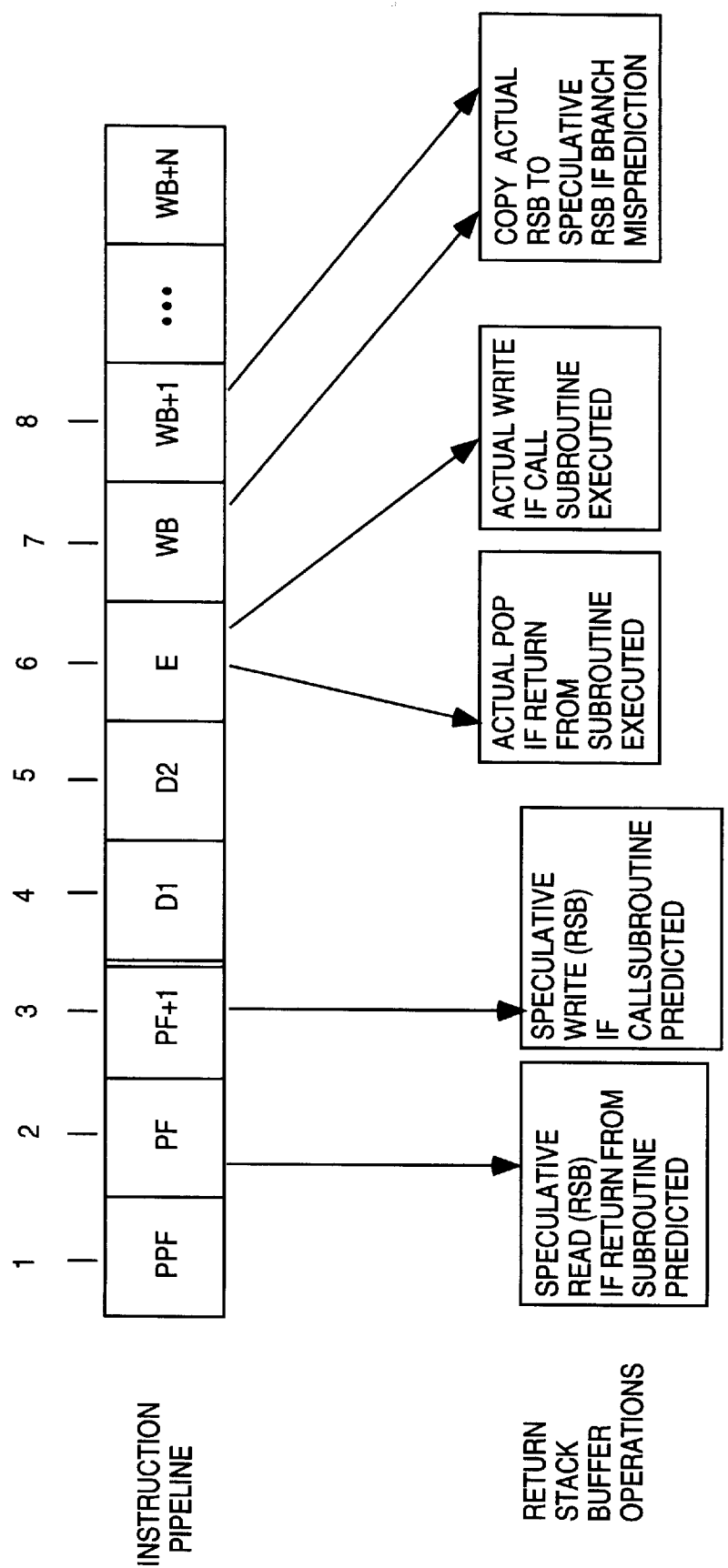
FIG. 2 is a block diagram of a deep microprocessor pipeline for processing microprocessor instructions.

In a deeply pipelined processor, the major stages of a pipelined processor such as instruction fetch, instruction decode, and instruction execute, are divided into several different substages such that each processing stage is pipelined. This results in a long instruction pipeline. For example, FIG. 2 illustrates a set of pipeline stages that defines one particular deeply pipelined processor. In the instruction pipeline of FIG. 2, the instruction processing is divided into several pipeline stages.

Figure 3:
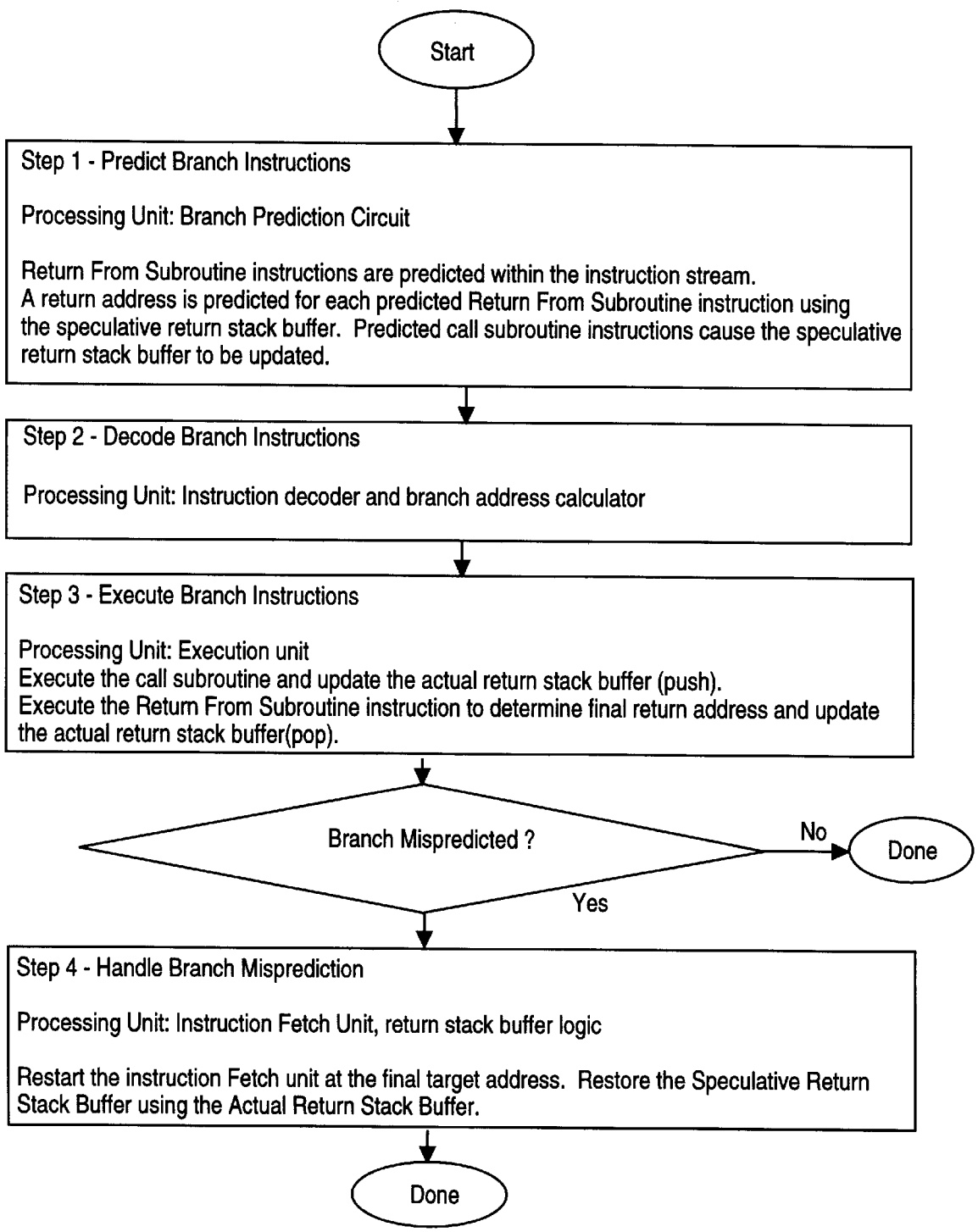
FIG. 3 is a flow diagram that explains how a microprocessor implementing the present invention predicts and resolves branch instructions.

To resolve Return From Subroutine instructions and other branch instructions in a microprocessor containing a deep pipeline such as the pipeline illustrated in FIG. 2, each branch instruction is analyzed at several different stages along the pipeline. FIG. 3 illustrates a flow diagram that describes the branch resolution steps that are performed.

The first step of FIG. 3 is a branch prediction step. This occurs during the prefetch stages of the instruction pipeline. During the branch prediction step the existence of branch instructions, such as Call Subroutine instructions and Return From Subroutine instructions, within the instruction stream are predicted. When the branch prediction step predicts a branch instruction, a branch target address is also predicted such that an instruction fetch unit can continue fetching instructions. After a branch prediction, subsequent instructions are "speculatively fetched" since the branch instruction may not have been predicted correctly.

When the branch prediction step predicts a Call Subroutine instruction in the instruction path, a corresponding subroutine target address is predicted using a branch target buffer. Furthermore, a Speculative Return Stack Buffer that will later be used to predict the return address is updated. Specifically, when a Call Subroutine instruction is predicted, then the address of the instruction following the Call Subroutine instruction is pushed onto the Speculative Return Stack Buffer. This is performed at stage PF+1 in the instruction pipeline of FIG. 2.

When the branch prediction step predicts a Return From Subroutine instruction in the instruction path, then a return address for the Return From Subroutine instruction must be predicted. The return address is predicted using the Speculative Return Stack Buffer that contains the stack of predicted return addresses. This operation is performed at stage PF in the instruction pipeline of FIG. 2. By predicting a return address for each Return From Subroutine instruction, the microprocessor can continue to fetch instructions without stalling until the Return From Subroutine instruction has executed.

The next step in resolving a branch instruction is to decode the branch instruction. The branch instruction is decoded by decode stages in the instruction pipeline.

After decoding, the next step to resolving a branch instruction is to execute the branch instruction as depicted in FIG. 3. This branch execution step occurs at the execution stage E in the instruction pipeline of FIG. 2. At the branch execution step, the branch instruction is executed such that a final branch decision and a final branch target address are determined.

When the branch execution stage executes a Call Subroutine instruction or a Return From Subroutine instruction, then special processing is performed in the branch prediction circuit of the present invention to maintain the Actual Return Stack Buffer 55. When the branch execution stage encounters a Call Subroutine instruction, then the final address of the next instruction is written into the Actual Return Stack Buffer 55. When the branch execution stage encounters a Return From Subroutine instruction, then the stack pointer into the Actual Return Stack Buffer 55 is popped. These actions ensure that the Actual Return Stack Buffer 55 contains architecturally correct information.

If the branch instruction was predicted successfully, then the branch instruction handling is complete as indicated by FIG. 3. However, if the branch instruction was mispredicted, then a branch misprediction handling step must be performed.

Branch misprediction handling is performed by the write results stages of the multistage pipeline of FIG. 2. To handle a mispredicted Return From Subroutine Instruction, the early pipeline stages are flushed. The early pipeline stages can also be flushed for other reasons such as self-modifying code. To restart the pipeline after a flush, the corrected return address is sent to the Instruction Fetch Unit.

Furthermore, the information in the Speculative Return Stack Buffer is corrected. To correct the information in the Speculative Return Stack Buffer, the write results stages in the instruction pipeline copy the information from the Architecturally correct Actual Return Stack Buffer 55 to the Speculative Return Stack Buffer 51.

Hardware for Resolving Return From Subroutine Instructions

Figure 4:
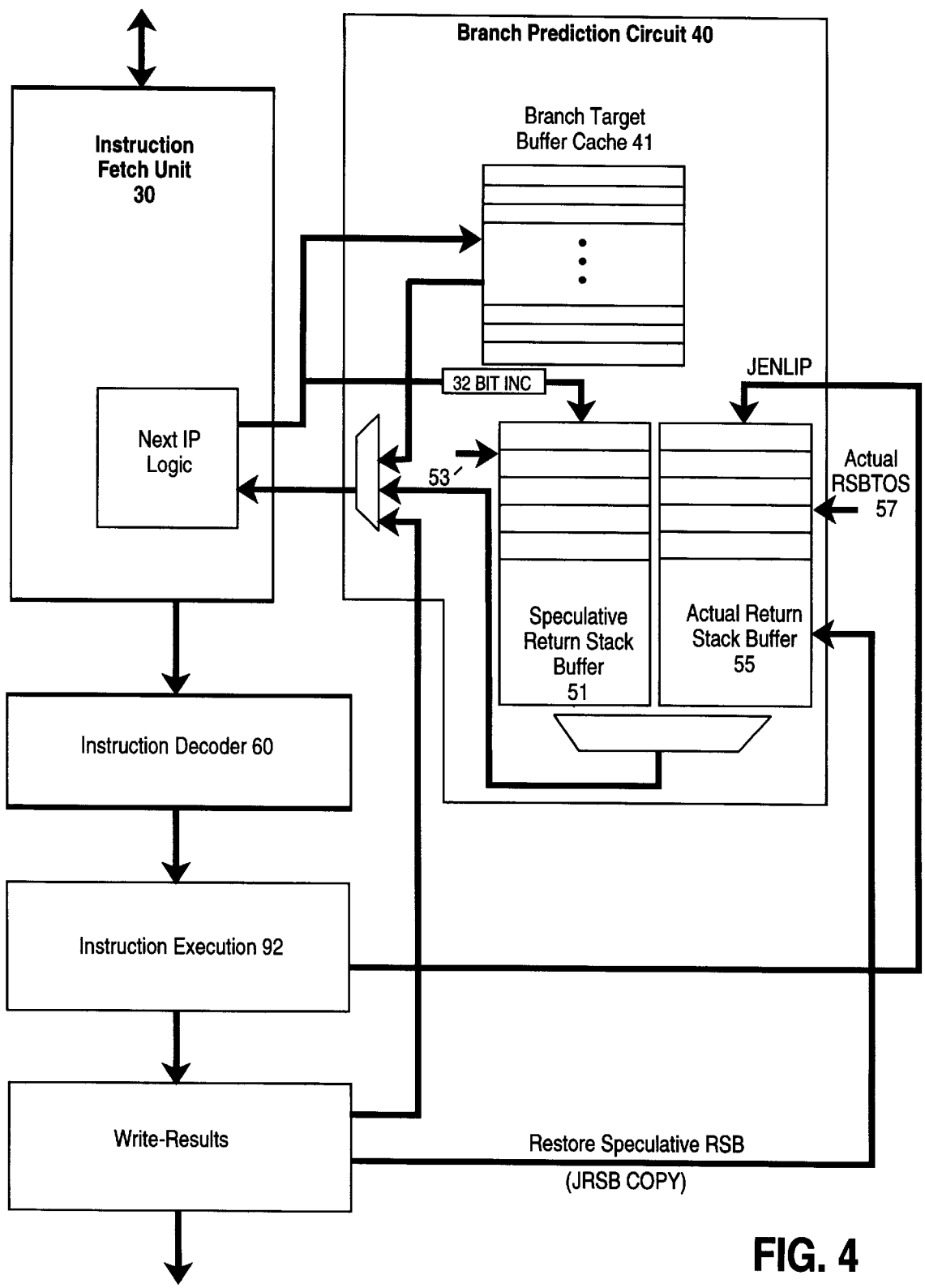
FIG. 4 is a block diagram of the different circuit blocks in a microprocessor that implements the deep pipeline illustrated in FIG. 2.

FIG. 4 illustrates a block diagram of the portions of a microprocessor necessary to explain how the dual return stack buffer mechanism of the present invention is used to handle Call Subroutine instructions and Return From Subroutine instructions. The dual return stack buffer mechanism resides within a Branch Prediction Circuit 40. The Branch Prediction Circuit 40 also has a Branch Target Buffer Cache 41 for predicting branch instructions, such as Call Subroutine instructions and Return From Subroutine instructions, within the instruction stream.

The branch prediction circuit 40 is used by the Instruction Fetch Unit 30 to determine the next address to fetch from. After the Instruction Fetch Unit 30 has fetched an instruction, the instruction is passed to an Instruction Decoder 60. Next, the instruction proceeds to an Execution Unit 92. After execution, Write Results stages write the results of the executed instruction.

Resolving Return From Subroutine Instructions

To fully describe how the present invention handles Call Subroutine instructions and Return From Subroutine instructions, the following detailed description will explain how Call Subroutine instructions and Return From Subroutine instructions are processed with reference to FIGS. 3 and 4. As illustrated in FIG. 3, the present invention resolves branch instructions in several different steps. Each step of FIG. 3 will be described individually with reference to the hardware of FIG. 4.

Step 1—Prediction of Branch Instructions

The first logic unit in the microprocessor depicted in FIG. 4 that works to resolve branch instructions is the Branch Prediction Circuit 40 that predicts the existence of branch instructions, such as Call Subroutine and Return From Subroutine, within the instruction stream. To predict branch instructions within the instruction stream, the Branch Prediction Circuit 40 maintains a cache that contains information about branch instructions that the microprocessor has previously executed. The cache containing the branch information is referred to as the Branch Target Buffer Cache 41. Each time a branch instruction is resolved by the microprocessor, the Branch Prediction Circuit 40 records the type of branch instruction, the branch instruction's target address, and the outcome of the branch instruction into the Branch Target Buffer Cache 41 for future reference.

The branch information entries in the Branch Target Buffer Cache 41 are indexed by the branch instruction's address. Indexing each entry by address allows the Branch Prediction Circuit 40 to look up previously seen branch instruction using an instruction pointer (IP).

Before each instruction fetch, the Instruction Fetch Unit 30 passes a current Instruction Pointer (IP) to the Branch Prediction Circuit 40 to learn if there is an upcoming branch instruction that directs the microprocessor to a nonsequential address. The Branch Prediction Circuit 40 examines the Branch Target Buffer Cache 41 using the Instruction Pointer, looking for an upcoming branch instruction. If the Branch Prediction Circuit 40 finds an upcoming branch instruction, a Branch Target Buffer Cache 41 "hit" has occurred and the Branch Prediction Circuit 40 makes a branch prediction using the branch information from the Branch Target Buffer Cache 41.

When a Branch Target Buffer Cache 41 "hit" occurs, the Branch Prediction Circuit 40 reads out the entry that contains the branch information. One of the fields within each branch information entry is a branch type field. Different branch types include Conditional branch instructions, Unconditional branch instructions, Return From Subroutine instructions, and Call Subroutine instructions. The Branch Prediction Circuit 40 handles the branch prediction differently depending upon what type of branch instruction is predicted. Note that although Call Subroutine and Return From Subroutine instructions are specific types of unconditional branch instructions, those two instructions are marked as different types. The Branch Prediction Circuit 40 marks Call Subroutine and Return From Subroutine instructions as different types since the Branch Prediction Circuit 40 handles those two branch instruction types in a special manner.

When the Branch Prediction Circuit 40 predicts a Call Subroutine instruction, the Branch Prediction Circuit 40 predicts a branch to the target address specified by the target field of the Branch Target Buffer Cache 41 entry. Furthermore, the Branch Prediction Circuit 40 decrements a top of stack pointer associated with the Speculative Return Stack Buffer 51 known as the Speculative RSB TOS pointer 53 (Return Stack Buffer Top-Of-Stack). Using the decremented Speculative RSB TOS pointer 53, the Branch Prediction Circuit 40 pushes the address of the instruction after the Call Subroutine instruction (a return address) onto the Speculative Return Stack Buffer 51. The address of the instruction after the Call Subroutine instruction is generated by passing the address Qf the last byte of the Call Subroutine instruction through a 32 bit wide increment circuit.

When the Branch Prediction Circuit 40 predicts a Return From Subroutine instruction, the Branch Prediction Circuit 40 predicts a return address using the Speculative Return Stack Buffer 51. Specifically, the return address in the Speculative Return Stack Buffer 51 pointed to by the Speculative RSB TOS pointer 53 is fetched and sent to the Instruction Fetch Unit. The Branch Prediction Circuit 40 then increments the Speculative RSB TOS pointer 53 so that the next most recent return address is pointed to.

Step 2—Decoding Return From Subroutine Instructions

Referring back to FIG. 3, after the Instruction Fetch Unit 30 fetches an instruction, the Instruction Fetch Unit 30 passes the instruction to the Instruction Decoder 60. The Instruction Decoder 60 decodes each microprocessor instruction received to determine the microprocessor instruction type. The Instruction Decoder 60 passes the decoded instruction to the execution unit.

Step 3—Executing Return From Subroutine Instructions

Although the Branch Prediction Circuit 40 predicts return addresses very accurately, not every prediction is correct.

Thus, since the predicted branch target addresses may be wrong, an execution unit must verify every branch target address predicted by the Branch Prediction Circuit 40. In the present invention, the execution unit also performs special processing on Call Subroutine and Return From Subroutine instructions to maintain the Actual Return Stack Buffer 55.

The Execution Unit 92 executes each Return From Subroutine instruction by determining a final return address. The final return address is determined by popping top value off the microprocessor architectural stack. Furthermore, the Execution Unit 92 maintains the Actual Return Stack Buffer 55 after each Return From Subroutine instruction by incrementing the Actual RSB TOS pointer 57.

The Execution Unit 92 executes each Call Subroutine instruction by verifying the branch target address. To maintain the Actual Return Stack Buffer 55, the Execution Unit 92 pushes the address of the instruction after the Call Subroutine instruction onto the Actual Return Stack Buffer 55 and the Actual RSB TOS 57 pointer is decremented.

Step 4—Handling Branch Mispredictions

The Execution Unit 92 compares the final target address with the predicted target address to determine if each branch instruction was predicted correctly or mispredicted. If the branch instruction was predicted correctly by the Branch Prediction Circuit 40, then the microprocessor simply resumes execution along the current path.

However, if the branch instruction was mispredicted, then the write results stages must handle the mispredicted branch instruction. The first step is to flush the early stages of the pipeline and restart the Instruction Fetch Unit 30 such that it starts fetching the correct instructions. This is performed by passing the final target address up to the Instruction Fetch Unit 30. After flushing the pipeline, the write result unit asserts the JRSBCOPY signal such that the contents of the Architecturally correct Actual Return Stack Buffer 55 are copied into the Speculative Return Stack Buffer 51. Also, the value of the Actual RSB TOS pointer 57 is copied into the Speculative RSB TOS pointer 53.

The foregoing has described several methods and apparatus for implementing a Speculative Return Stack Buffer in a computer processor. It is contemplated that changes and modifications may be made by one of ordinary skill in the art, to the materials and arrangements of elements of the present invention without departing from the scope of the invention.

We claim:

1. An apparatus for predicting return addresses for Return From Subroutine instructions, said apparatus comprising:
   a speculative return stack buffer, said speculative return stack buffer comprising a plurality of branch entries for storing information about a plurality of speculatively fetched branch instructions;
   an actual return stack buffer, said actual return stack buffer comprising a plurality of branch entries for storing information about a plurality of fully executed branch instructions; and
   a copy signal, said copy signal asserted when a pipeline flush occurs, and when said copy signal is asserted then said information about said plurality of fully executed branch instructions is copied into said speculative return stack buffer.

2. The apparatus as claimed in claim 1 wherein said speculative return stack buffer and said actual return stack buffer are bit interleaved.

3. The apparatus as claimed in claim 1 wherein said speculative return stack buffer is updated by a branch prediction circuit using branch instructions predicted by a branch target buffer.

4. The apparatus as claimed in claim 1 wherein said actual return stack buffer is updated by an execution unit using branch instructions that have been fully executed by an execution unit.

5. The apparatus as claimed in claim 1 wherein said speculative return stack buffer further comprises a speculative return stack buffer top of stack pointer and said actual return stack buffer further comprises an actual return stack buffer top of stack pointer.

6. The apparatus as claimed in claim 5 wherein said actual return stack buffer top of stack pointer is copied into said speculative return stack buffer top of stack pointer when said copy signal is asserted.

7. An apparatus for processing computer instructions, said apparatus comprising:
   a branch prediction circuit, said branch prediction circuit comprising:
      a branch target buffer cache for predicting branch instructions and branch target addresses for said branch instructions;
      a speculative return stack buffer, said speculative return stack buffer comprising a plurality of branch entries for storing information about a plurality of speculatively fetched branch instructions;
      an actual return stack buffer, said actual return stack buffer comprising a plurality of branch entries for storing information about a plurality of fully executed branch instructions; and
      a copy signal, said copy signal asserted when a pipeline flush occurs, and when said copy signal is asserted then said information about said plurality of fully executed branch instructions is copied into said speculative return stack buffer;
   an instruction fetch unit, said instruction fetch unit for fetching computer instructions;
   an execution unit, said execution unit for executing computer instructions; and
   a write results stage, said write results stage for writing results of fully executed computer instructions and for handling mispredictions of said speculatively fetched branch instructions.

8. The apparatus as claimed in claim 7 wherein said write results stage copies said information about a plurality of fully executed branch instructions from said actual return stack buffer into said speculative return stack buffer information when a pipeline flush occurs.

9. The apparatus as claimed in claim 7 wherein said speculative return stack buffer and said actual return stack buffer are bit interleaved.

10. The apparatus as claimed in claim 7 wherein said speculative return stack buffer is updated by said branch prediction circuit using branch instructions predicted by said branch target buffer.

11. The apparatus as claimed in claim 7 wherein said actual return stack buffer is updated by said execution unit using branch instructions that have been fully executed by said execution unit .

12. The apparatus as claimed in claim 7 wherein said speculative return stack buffer further comprises a speculative return stack buffer top of stack pointer and said actual return stack buffer further comprises an actual return stack buffer top of stack pointer.

13. The apparatus as claimed in claim 12 wherein said actual return stack buffer top of stack pointer is copied into said speculative return stack buffer top of stack pointer when a pipeline flush occurs.

14. The apparatus as claimed in claim 7 wherein said pipeline flush occurs after a branch misprediction.

15. A method for processing branch instructions, said method comprising:

predicting branch instructions with a branch target buffer;

updating a speculative return stack buffer comprising a plurality of branch entries with information from said predicted branch instructions;

decoding each processor instruction to determine instruction type;

executing said branch instructions;

updating an actual return stack buffer comprising a plurality of branch entries with information about said executed branch instructions;

verifying final branch target address of each said branch instructions with predicted target address; and copying said information about said executed branch instructions in said actual return stack buffer into said speculative return stack buffer when a pipeline flush occurs.

16. The method for processing branch instructions as claimed in claim 15, said method further comprising:

predicting return address for Return From Subroutine instructions with said speculative return stack buffer.

17. The method for processing branch instructions as claimed in claim 15, said method further comprising:

flushing and restarting processor instruction pipeline when a branch instruction is mispredicted.

* * * * *

UNITED STATES PATENT AND TRADEMARK OFFICE
CERTIFICATE OF CORRECTION

PATENT NO. : 5,964,868
DATED : October 12, 1999
INVENTOR(S) : Gochman et al.

It is certified that error appears in the above-identified patent and that said Letters Patent is hereby corrected as shown below:

Column 4,
Line 64, after "pointer", insert -- , Actual RSB TOS pointer 57, --.

Column 6,
Line 46, delete "Qf", insert -- of --.

Signed and Sealed this

Seventeenth Day of June, 2003

JAMES E. ROGAN
*Director of the United States Patent and Trademark Office*